(12) United States Patent
Uskert et al.

(10) Patent No.: US 9,694,909 B2
(45) Date of Patent: Jul. 4, 2017

(54) MODULAR MOUNTING STRUCTURE WITH EMBEDDED ELECTRICAL BUS

(71) Applicant: AAI Corporation, Hunt Valley, MD (US)

(72) Inventors: Richard C. Uskert, Monkton, MD (US); Paul Nesline, Columbia, MD (US)

(73) Assignee: AAI Corporation, Hunt Valley, MD (US)

( * ) Notice: Subject to any disclaimer, the term of this patent is extended or adjusted under 35 U.S.C. 154(b) by 26 days.

(21) Appl. No.: 14/333,621

(22) Filed: Jul. 17, 2014

(65) Prior Publication Data

US 2016/0016666 A1    Jan. 21, 2016

(51) Int. Cl.
| | |
|---|---|
| *B64C 1/22* | (2006.01) |
| *B64D 7/00* | (2006.01) |
| *B64D 9/00* | (2006.01) |
| *B64D 47/08* | (2006.01) |

(52) U.S. Cl.
CPC .................. *B64D 7/00* (2013.01); *B64C 1/22* (2013.01); *B64D 9/00* (2013.01); *B64D 47/08* (2013.01); *B64C 2201/127* (2013.01)

(58) Field of Classification Search
None
See application file for complete search history.

(56) References Cited

U.S. PATENT DOCUMENTS

| | | | | |
|---|---|---|---|---|
| 3,189,313 A | * | 6/1965 | Burns | B64D 9/003 16/93 R |
| 3,693,920 A | * | 9/1972 | Trautman | B64D 9/003 410/77 |
| 3,756,544 A | * | 9/1973 | Bader | B64D 9/00 244/137.1 |
| 4,033,247 A | * | 7/1977 | Murphy | B64C 1/18 137/513.3 |
| 4,318,328 A | | 3/1982 | Rona | |
| 6,572,304 B1 | * | 6/2003 | Hessling | B60R 11/00 244/118.5 |
| 6,902,365 B1 | * | 6/2005 | Dowty | B60N 2/01575 244/118.6 |
| 8,162,262 B2 | | 4/2012 | Kutzmann et al. | |
| 8,251,307 B2 | | 8/2012 | Goossen | |
| 8,256,715 B2 | | 9/2012 | Ballard et al. | |
| 8,260,479 B2 | | 9/2012 | Christenson et al. | |
| 8,328,130 B2 | | 12/2012 | Goossen | |
| 8,337,127 B2 | * | 12/2012 | Moradians | B60P 7/0815 410/101 |
| 8,662,441 B2 | | 3/2014 | Powell et al. | |
| 2004/0129445 A1 | * | 7/2004 | Winkelbach | B64C 1/18 174/76 |

(Continued)

FOREIGN PATENT DOCUMENTS

| | | |
|---|---|---|
| AU | 2011276454 A1 | 2/2013 |
| CA | 2840582 A1 | 1/2012 |
| TW | 201206767 A | 2/2012 |

OTHER PUBLICATIONS

International Search Report for International Application No. PCT/US2015/039890 mailed from the International Searching Authority on Oct. 9, 2015, 10 pages.

*Primary Examiner* — Medhat Badawi
(74) *Attorney, Agent, or Firm* — BainwoodHuang

(57) ABSTRACT

A modular mounting structure is described which allows for the easy installation and removal of various payloads from a vehicle structure. An embedded electrical bus feature further supports the installation of the various payloads into the vehicle structure.

21 Claims, 9 Drawing Sheets

(56) References Cited

U.S. PATENT DOCUMENTS

| | | | |
|---|---|---|---|
| 2005/0029399 A1 | 2/2005 | Lowe et al. | |
| 2006/0108477 A1* | 5/2006 | Helou | B64C 1/00 244/137.1 |
| 2007/0176048 A1* | 8/2007 | Huber | B64C 1/061 244/119 |
| 2008/0217478 A1* | 9/2008 | Keeler | B64C 1/18 244/119 |
| 2009/0026318 A1* | 1/2009 | Gross | B64D 11/003 244/131 |
| 2009/0050739 A1* | 2/2009 | Guering | B64C 1/22 244/118.5 |
| 2010/0116932 A1* | 5/2010 | Helou, Jr. | B64C 1/00 244/118.1 |
| 2010/0320327 A1* | 12/2010 | Sayilgan | B64C 1/406 244/131 |
| 2011/0233337 A1* | 9/2011 | Pozzi | B64C 1/18 244/122 R |
| 2012/0160961 A1 | 6/2012 | Curry et al. | |
| 2012/0273613 A1* | 11/2012 | Ulbrich-Gasparevic | B64D 11/0023 244/118.1 |
| 2014/0097296 A1 | 4/2014 | Sankrithi | |
| 2015/0122940 A1* | 5/2015 | Mairou | B64D 1/22 244/17.11 |
| 2015/0244121 A1* | 8/2015 | Amelio | H01R 24/78 439/345 |
| 2016/0025264 A1* | 1/2016 | Casagrande | A01K 97/06 248/205.9 |
| 2016/0031382 A1* | 2/2016 | Chinn | B60P 7/0815 248/222.11 |

* cited by examiner

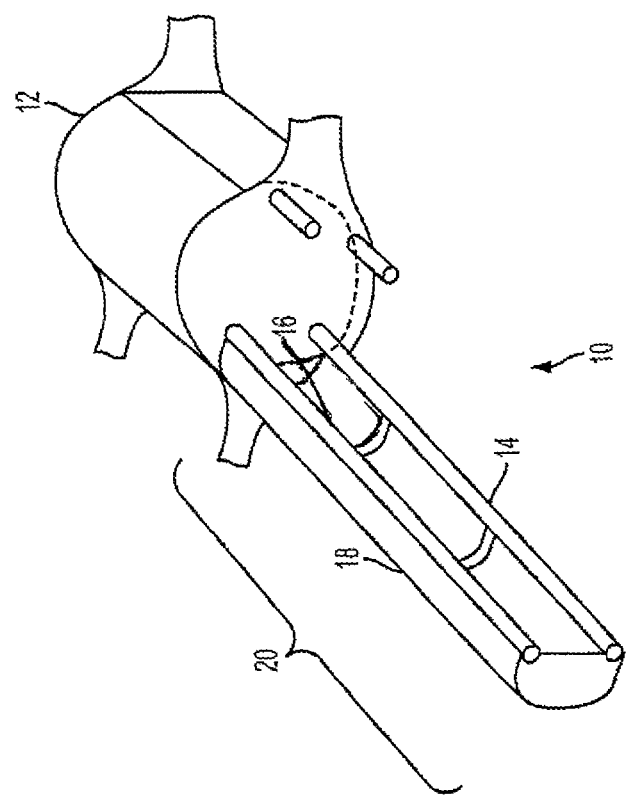
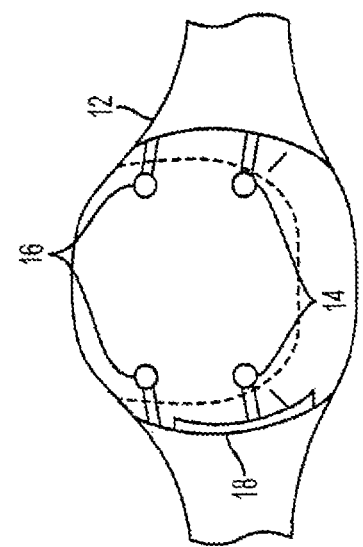
FIG. 1A
FIG. 1B

MODULAR MOUNTING STRUCTURE WITH EMBEDDED ELECTRICAL BUS

TECHNICAL FIELD

The present disclosure relates generally to apparatus, systems and methods for attachment of a payload to an aircraft. In particular, the present disclosure relates to modular apparatus, systems and methods for attachment of a payload to an air vehicle, such as an Unmanned Aerial Vehicle (UAV).

BACKGROUND

The current art exists for attachment of an payload to an aircraft, specifically, a UAV, that consists of multiple threaded or lug connections to a floor. These connections are often specific to the payload being attached, prohibiting the mounting of an alternate payload in the same location without modification to the floor structure or through the use of an adapter plate.

Therefore, an improved method of attaching an payload to an aerial vehicle is needed that can easily be incorporated into the structure of the aerial vehicle, that allows for quick and easy load and unload of a payload.

BRIEF DESCRIPTION OF THE DRAWINGS

FIG. 1A is an iso-metric view showing an embodiment of the invention,

FIG. 1B is a simplified cross-sectional view of an embodiment of the invention,

DETAILED DESCRIPTION OF INVENTION

Figure 2:
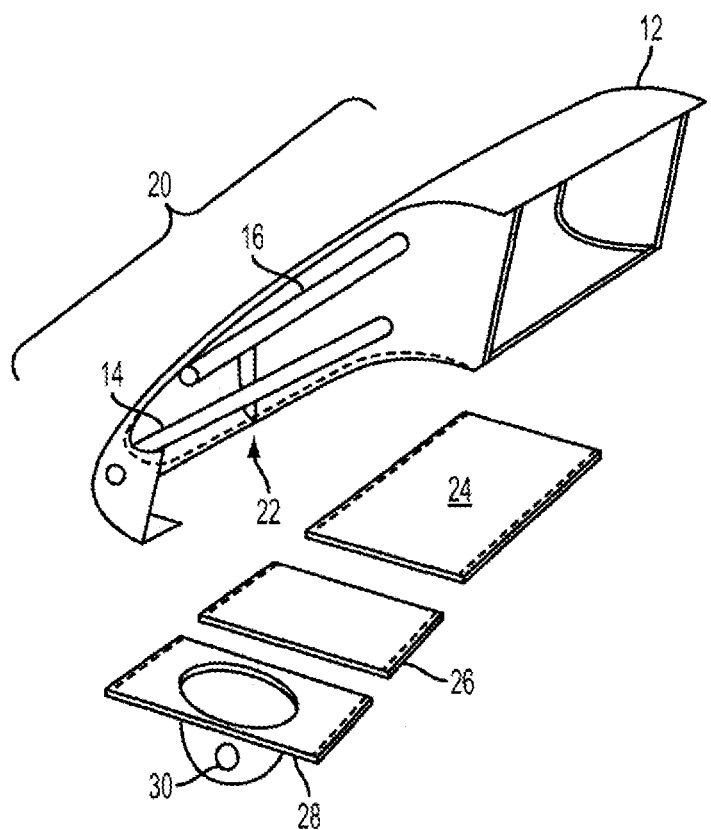
FIG. 2 is a cut away, exploded view of an embodiment of the invention.
Figure 3:
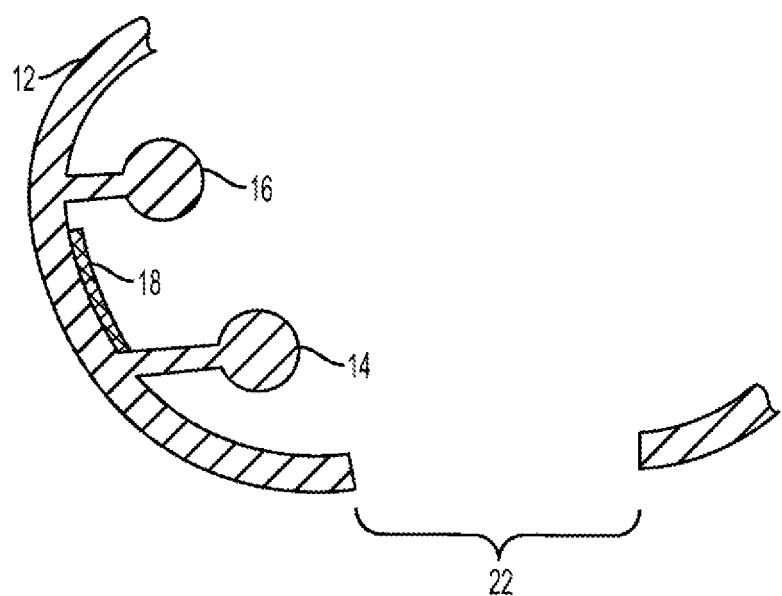
FIG. 3 is a cross-sectional view of an embodiment of the invention.

Embodiments in accordance with the present disclosure are set forth in the following text to provide a thorough understanding and enabling description of a number of particular embodiments. Numerous specific details of various embodiments are described below with reference to attachment of payloads to an aerial vehicle, but embodiments can be used with other features. In some instances, well-known structures or operations are not shown, or are not described in detail to avoid obscuring aspects of the inventive subject matter associated with the accompanying disclosure. A person skilled in the art will understand, however, that the invention may have additional embodiments, or that the invention may be practiced without one or more of the specific details of the embodiments as shown and described.

Referring to FIGS. 1A, 1B, 2, 3 and 4 which depicts an embodiment of the modular mounting structure 10 in accordance with the invention. It should be noted that the figures may only show one half of the vehicle structure and it is understood that the structural features discussed will be essentially symmetrical about the vehicle's longitudinal centerline.

Aircraft structure 12 is well known in the art and can be fabricated using many well known processes. A lower rail 14 and upper rail 16 extend along a longitudinal axis of the aircraft structure 12 in the general area of an aircraft's payload region denoted generally as item 20 which is adjacent to a payload bay 22. The lower rail 14 and upper rail 16 are sized and configured to allow for a payload to be dropped in from above (e.g., see opening 23 in FIG. 4) and interface with both rails 14 and 16. The rail 14 and 16 cross-section is shown in the figures as circular in nature, but that is not a limiting feature and the cross-section can be any suitable cross-section that allows for easy engagement with a payload mount (e.g., see FIG. 4).

An embedded electrical bus 18 is disposed on an internal surface of the aircraft structure 12, preferably in the area of the rails 14 and 16. The electrical bus 18 is configured to allow for the quick and easy connection of the electrical components of a payload 30. The payload 30 may be a high resolution camera, an infrared/thermal camera, a laser designator or the like.

Referring specifically to FIG. 2, the payload 30 along with a payload panel 28 is shown adjacent to the payload bay 22. Through the use of the modular rails 14 and 16, the payload may be mounted anywhere along the longitudinal length of the rails 14 and 16 rather than be mounted in a predetermined and fixed location. This feature therefore allows for the quick and easy mounting of various payloads without the need to make changes to the structure of the aircraft. In order to seal up the payload bay 22, a first panel 24 may be affixed to the aircraft using any well known means and it may also be advantageous to secure a second panel 26 to completely seal up the payload bay.

Figure 4:
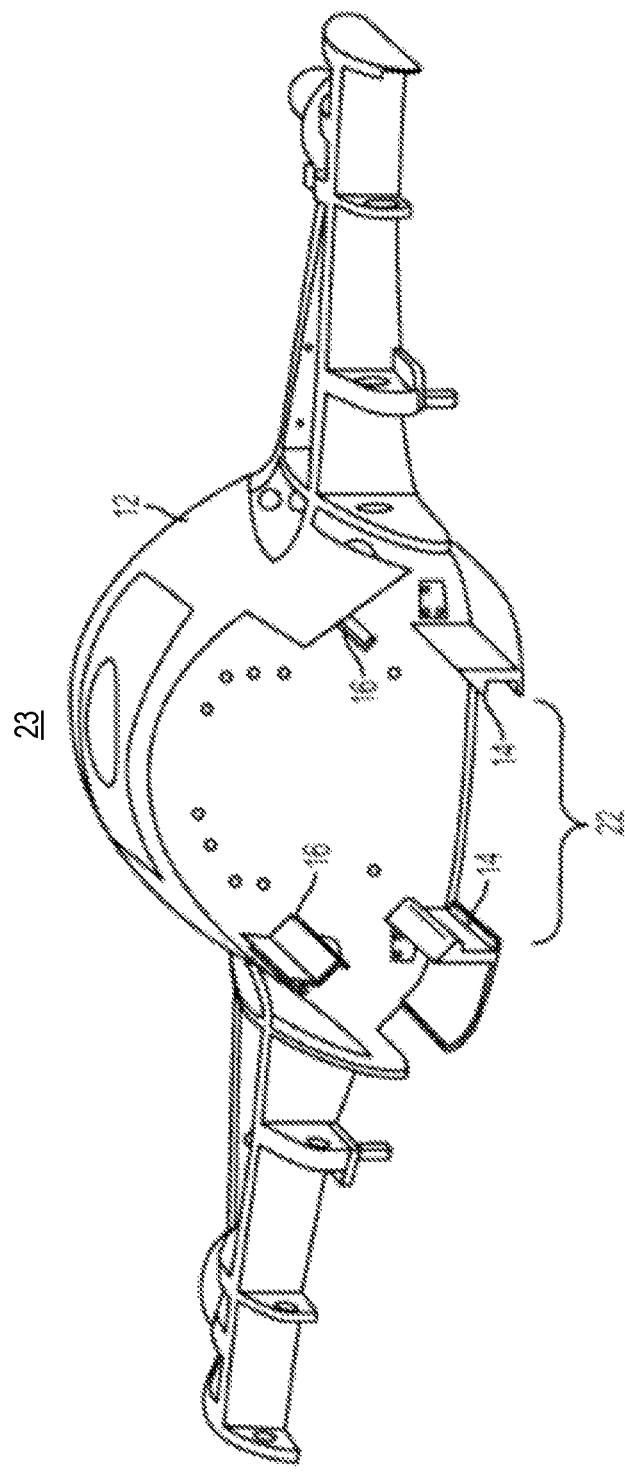
FIG. 4 is an isometric view of an embodiment of the invention.

Referring specifically to FIG. 4, which shows a unified structural component of an aircraft structure 12 wherein the lower rails 14 and upper rails 16 may be integrally formed surfaces of the aircraft structure 12. Alternatively, the rails 14 and 16 may also be attached to aircraft structure 12 using any well known attachment means.

Figure 5:
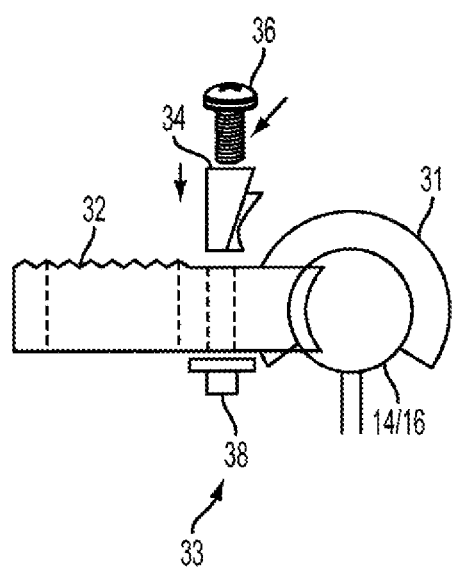
FIG. 5 is a simplified plan view of an embodiment of the invention.

Referring now to FIG. 5, which depicts a mounting device 33 which is configured to interface with and lock onto rails 14 and 16. Mounting device 33 is comprised of a fitting 31 which is configured to engage the rails 14 and 16 as may be desired. A mount structure 32 extends from the fitting 31 and is configured to interface with the payload 30. In order to lock the mounting device 33 to the rails, a wedge 34 is inserted in a slot in the fitting 31. A threaded fastener 36 is inserted through the wedge 34 and is threaded into a nut 38 such that when the threaded fastener 36 is tightened, the wedge 34 is forced to engage the rail 14/16 and lock the position of the mounting device 33 in the preferred location. In this manner, several mounting devices may be employed to fixedly locate the payload 30 at a predetermined position within the payload bay 22.

Figure 6:
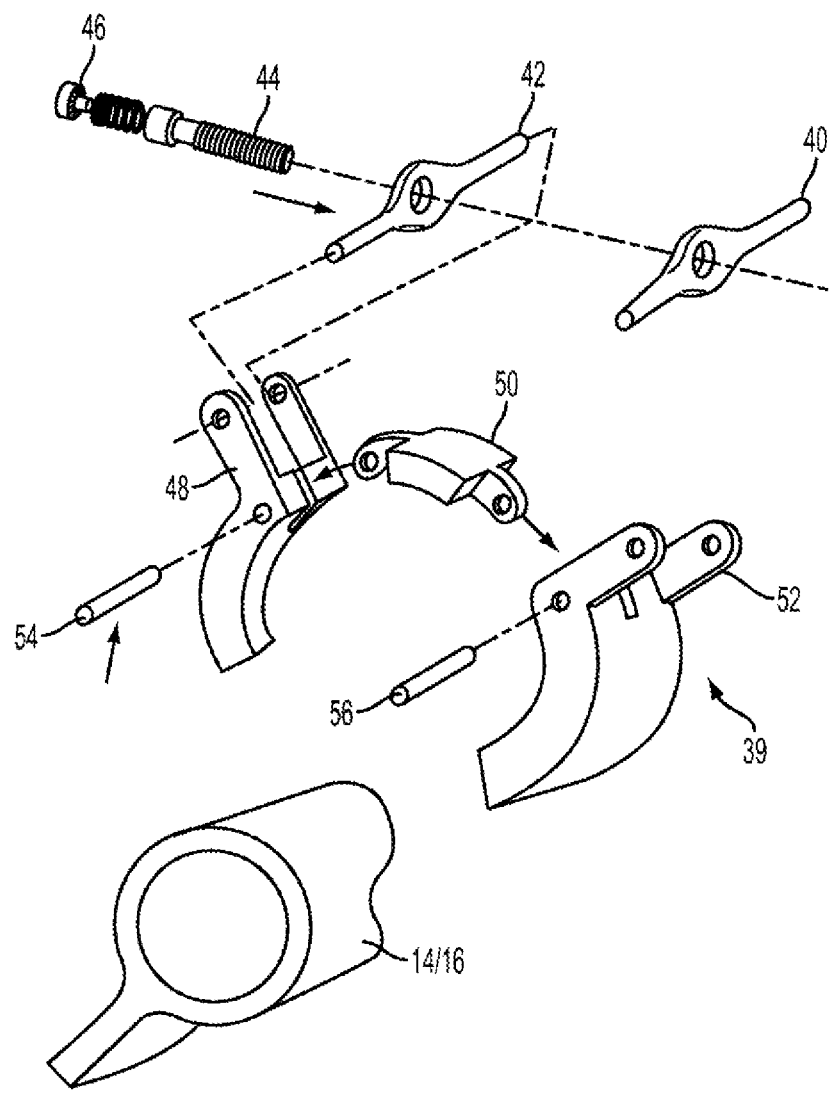
FIG. 6 is an isometric exploded view of an embodiment of the invention.

Referring now to FIG. 6, which depicts an alternative embodiment of a mounting device 39. In this embodiment, a first arm 40 and second arm 42 are inserted in a first clamp link 48 and a second clamp link 52 respectively. The clamp links 48 and 52 are configured to engage and clamp around the rails 14/16 as may be required in order to fixedly mount a payload 30. A center link 50 is disposed between clamp links 48 and 52 through the use of pins 54 and 56 such that the clamp links 48 and 52 rotate about the center link 50 to engage and disengage the rails 14/16. A threaded fastener 44 is inserted through second arm 32 and threadingly engages with first arm 40 such that the opening and closing of the mounting device 39 is controlled by the adjustment of the threaded fastener 44. A cap screw 46 may alternatively be provided to limit the amount of torque that can be applied to the fastener 44 to prevent over tightening of the mounting device 39. In this manner, several mounting devices may be employed to fixedly locate the payload 30 at a predetermined position within the payload bay 22.

Figure 7:
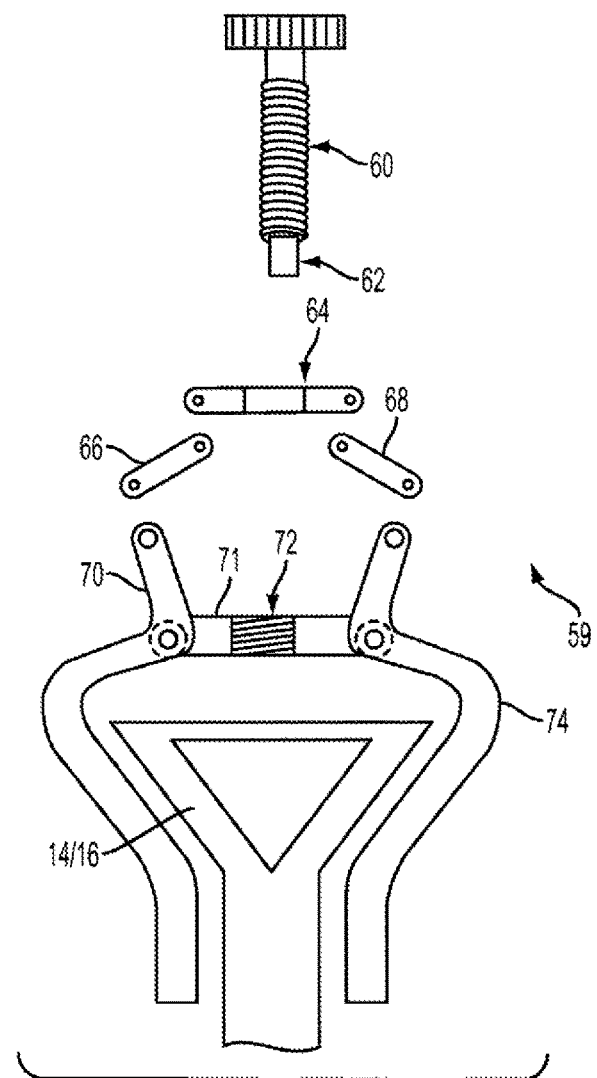
FIG. 7 is an exploded view of an embodiment of the invention.

Referring now to FIG. 7, which shows another embodiment of a mounting device 59 wherein the rails 14/16 have a triangular cross-section. A first clamping link 70 and second clamp link 74 are pivotally connected to a center link 71. The clamping links 70 and 72 are configured to releasably engage around the cross-section of the mounting rails 14/16. A first pivot link 66 and second pivot link 68 are pivotally attached to first clamp link 70 and second clamp link 74 respectively. A mid link 64 is also pivotally connected between pivot links 66 and 68 such that as the mid link 64 is lowered, the first and second clamp links 70 and 74 rotate to an engaged position around the rails 14/16. Similarly, as the mid link 64 is raised, the first and second clamp links 70 and 74 rotate to a disengaged position from the rails 14/16. An adjustment screw 60, having a shouldered distal end 62 is configured to engage a threaded hole 72 disposed on center link 71 to facilitate the attachment of the mounting device 59 to the rails 14/16.

Figure 8:
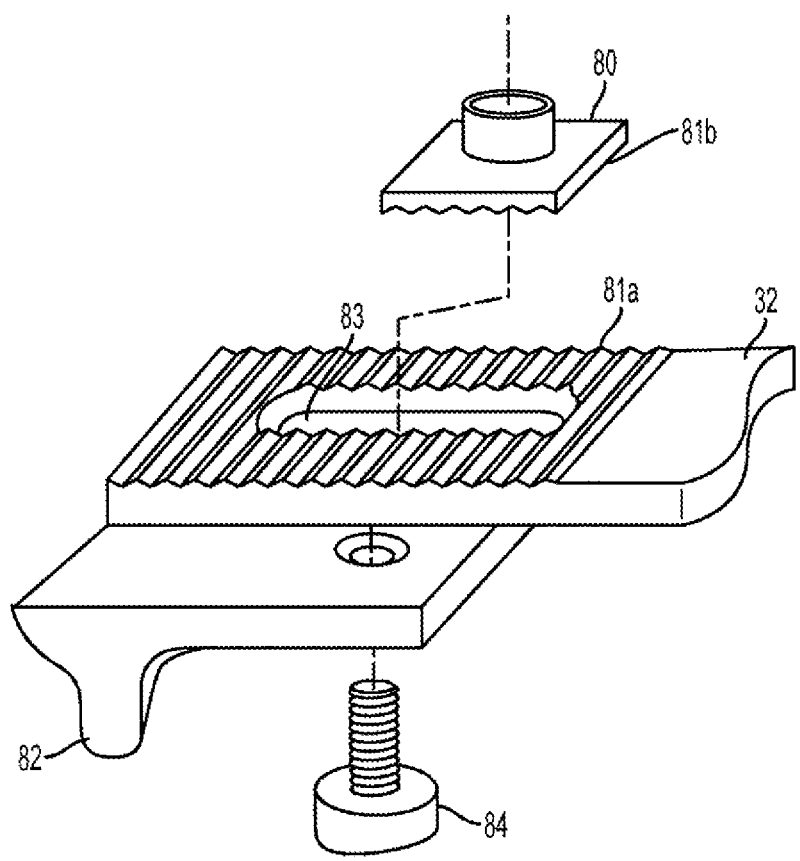
FIG. 8 is an isometric exploded view of an embodiment of the invention.

Referring now to FIG. 8, which shows a mount 32 (see FIG. 5) which may be used to attach a payload to the rail structure. This embodiment of an attachment means is comprised of a payload attachment point 82 which may be rigidly affixed to a payload. A slot 83 disposed on the mount 32 is configured to accept a mounting bolt 84 that is inserted through a hole in the attachment point 82. The mounting bolt 84 threadingly engages a nut 80 which is configured to clamp done and affix the attachment point 82 to the mount 32. Serrated surfaces 81a and 81b may be provided on the mating surfaces of the mount 32 and the nut 80 to further secure the positioning of the payload to the rail structure. The slot 81 is provided to allow for the easy adjustment and placement of a wide range of payload sizes.

Figure 9:
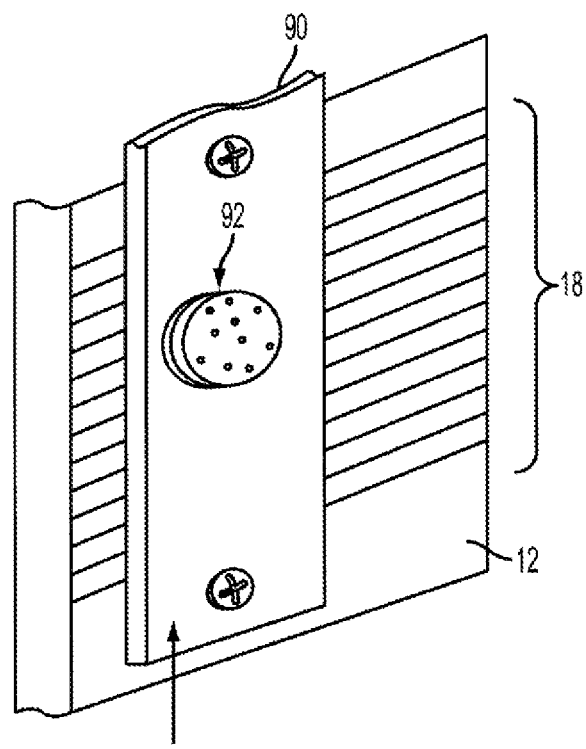
FIG. 9 is an isometric view of an embodiment of the invention.

Referring now to FIG. 9 which depicts a connector plate 90 electrically interfacing with the embedded electrical bus 18. The connector plate 90 is comprised of an electrical connector 92 which is configured to attach to an electrical cable of a given payload. The connector plate 90 is affixed to the structure of the aircraft by any well known means. The connector plate 90 may be placed anywhere along the structure of the aircraft which facilitates the installation of a wide variety of payloads that may have different cabling requirements.

The invention claimed is:

1. A mounting system for the removable attachment of a payload to an unmanned air vehicle, the mounting system comprising:
    a pair of lower rails disposed adjacent a payload area of the unmanned air vehicle, said lower rails configured to interface with the payload; and
    a pair of upper rails disposed adjacent the payload area, said upper rails spaced apart from said lower rails, said upper rails configured to interface with the payload;
    wherein the unmanned air vehicle includes an aircraft structure having a left side and a right side, the aircraft structure defining an inner cavity and a payload bay;
    wherein the pair of lower rails includes (i) a left lower rail disposed within the inner cavity along the left side of the aircraft structure and (ii) a right lower rail disposed within the inner cavity along the right side of the aircraft structure;
    wherein the pair of upper rails includes (i) a left upper rail disposed within the inner cavity along the left side of the aircraft structure and (ii) a right upper rail disposed within the inner cavity along the right side of the aircraft structure;
    wherein the pair of lower rails are closer to the payload bay than the pair of upper rails;
    wherein the rails are arranged to receive delivery of the payload from a location above the unmanned air vehicle, the payload interfacing with the rails upon being dropped in from above the unmanned air vehicle.

2. The mounting system of claim 1, wherein said lower rails and said upper rails extend along a longitudinal axis of the unmanned air vehicle.

3. The mounting system of claim 1, wherein said lower rails and said upper rails are symmetrically spaced about a longitudinal axis of the unmanned air vehicle.

4. The mounting system of claim 1, wherein said lower rails and said upper rails are integrally formed into the aircraft structure of the unmanned air vehicle.

5. The mounting system of claim 1, further comprising:
    a plurality of mounting devices that engages and locks onto said upper and lower rails, each mounting device being constructed and arranged to attach the payload to one of the upper and lower rails.

6. The mounting system of claim 1, further comprising:
    an electrical bus embedded into the aircraft structure of the unmanned air vehicle, said electrical bus being constructed and arranged to electrically interface with the payload.

7. The mounting system of claim 6, further comprising:
    a connector plate in electrical communication with said electrical bus, the connector plate including an electrical connector constructed and arranged to attach to an electrical cable of the payload.

8. The mounting system of claim 1, wherein the aircraft structure further defines a longitudinal axis; and
    wherein each lower rail and each upper rail extends along the longitudinal axis and is integrally formed into the aircraft structure, the pair of lower rails and the pair of upper rails being parallel to each other.

9. The mounting system of claim 8, further comprising:
    an electrical bus which extends along the longitudinal axis and which is parallel to the pair of lower rails and the pair of upper rails, the electrical bus electrically interfacing the unmanned air vehicle to a set of payload components.

10. The mounting system of claim 9, further comprising:
    a connector plate which affixes to the aircraft structure, the connector plate interconnecting the electrical bus to at least one payload component.

11. The mounting system of claim 1, further comprising:
    mounting devices that mount to the pair of lower rails and the pair of upper rails, each mounting device including (i) a mount structure for physical communication with the payload and (ii) a threaded fastener which fastens the mount structure to a respective rail when turned in a first direction and releases the mount structure from the respective rail when turned in a second direction opposite the first direction.

12. The mounting system of claim 11 wherein each rail has a uniform cross-section; and wherein each mounting device is constructed and arranged to be (i) placed at any location along a longitudinal length of a respective rail and (ii) mounted to that location.

13. The mounting system of claim 1, further comprising:

a set of panel members which, in combination with the payload, forms a seal to cover the payload bay.

14. An unmanned air vehicle, comprising:

an aircraft structure having a left side and a right side, the aircraft structure defining an inner cavity and a payload bay;

a pair of lower rails including (i) a left lower rail disposed within the inner cavity along the left side of the aircraft structure and (ii) a right lower rail disposed within the inner cavity along the right side of the aircraft structure;

a pair of upper rails including (i) a left upper rail disposed within the inner cavity along the left side of the aircraft structure and (ii) a right upper rail disposed within the inner cavity along the right side of the aircraft structure, the pair of lower rails being closer to the payload bay than the pair of upper rails; and payload mounting devices which individually fasten to the rails at locations along the rails to attach a payload to the unmanned air vehicle;

wherein the rails are arranged to receive delivery of the payload from a location above the unmanned air vehicle, the payload interfacing with the rails upon being dropped in from above the unmanned air vehicle.

15. The unmanned air vehicle of claim 14 wherein each mounting device includes (i) a mount structure which physically communicates with the payload and (ii) a threaded fastener which fastens the mount structure to a respective rail when turned in a first direction and releases the mount structure from the respective rail when turned in a second direction opposite the first direction;

wherein each rail has a uniform cross-section; and wherein each mounting device is placeable at any location along a longitudinal length of a respective rail and mounted to that location.

16. The unmanned air vehicle of claim 15 wherein the aircraft structure further defines a longitudinal axis;

wherein each lower rail and each upper rail extends along the longitudinal axis and is integral with the aircraft structure, the pair of lower rails and the pair of upper rails being parallel to each other;

wherein the unmanned air vehicle further comprises:

an electrical bus which extends along the longitudinal axis and which is parallel to the pair of lower rails and the pair of upper rails, the electrical bus electrically interfacing the unmanned air vehicle to a set of payload components of the payload.

17. The unmanned air vehicle of claim 16, further comprising:

a connector plate which affixes to the aircraft structure, the connector plate interconnecting the electrical bus to at least one payload component of the payload; and a set of panel members which, in combination with the payload, forms a seal covering the payload bay.

18. The mounting system of claim 1, further comprising:

a structure that (i) positions the lower rails a first distance apart from each other and (ii) positions the upper rails a second distance apart from each other and above the lower rails, the first distance being smaller than the second distance.

19. The mounting system of claim 1 wherein the aircraft structure of the unmanned air vehicle defines, as the payload bay, an opening at bottom location of the unmanned air vehicle; and wherein upon the payload being dropped in from above the unmanned air vehicle and attached to the rails, the rails support the payload so that the payload extends from the inner cavity to an external region beneath the inner cavity through the opening.

20. The mounting system of claim 19 wherein the aircraft structure of the unmanned air vehicle is constructed and arranged to receive a set of panels that completely seals the opening at the bottom location of unmanned air vehicle while the rails provide support for the payload.

21. The unmanned air vehicle of claim 16 wherein the aircraft structure of the unmanned air vehicle defines, as the payload bay, an opening at bottom location of the unmanned air vehicle;

wherein upon the payload being dropped in from above the unmanned air vehicle and attached to the rails, the rails support the payload so that the payload extends from the inner cavity to an external region beneath the inner cavity through the opening; and wherein the unmanned air vehicle further comprises:

a set of panels that completely seals the opening at the bottom location of unmanned air vehicle while the payload extends from the inner cavity to an external region beneath the inner cavity through the opening.

* * * * *